Patented Nov. 7, 1933

1,933,868

UNITED STATES PATENT OFFICE 1,933,868

METHOD OF FILTER-AID DEWAXING

John F. Mitchell-Roberts, Piedmont, Calif., assignor, by mesne assignments, to The Texas Company, New York, N. Y., a corporation of Delaware No Drawing. Application April 21, 1930
Serial No. 446,188

4 Claims. (Cl. 196—19)

This invention relates to a method of treating wax containing hydro-carbon oils by which they are placed in a condition whereby the wax content may be more readily separated by mechanical filtration.

The Rosenbaum Patent #1,278,023 discloses a method of recovering the wax content of hydrocarbon oils wherein the mixture of wax and oil is first treated with a filter aid and then the resulting mixture is chilled to effect the solidification of the wax upon the filter aid. After the mixture has been chilled the wax content, together with the filter aid can be easily separated from the liquid content.

The Weir et al. Patent #1,509,325 discloses a method of separating the wax content of a hydro-carbon oil wherein the mixture is chilled after a filter aid has first been added thereto. Chilling brings about the solidification of the wax which adheres to the filter aid and which can then be mechanically filtered from the oil content.

Both of the above patents disclose the steps of adding a filter aid and chilling and when these steps are carried out in the sequence given therein, it is thought that the filter aid which may take the form of diatomaceous earth, FILTER-CEL or other equivalent comminuted filter aid, acts as a "seed" about or upon which particles of wax may form. Used in this way, the filter aid apparently serves as a flocculating agent and causes the wax to assume some definite form. This of course, as experience has shown, is quite essential if the wax is to be separated from the oil content by mechanical filtration. There are, however, some disadvantages to carrying out the process in the above sequences and therefore experiments have been made wherein the addition of filter aid is made after the mixture of oil and wax has first been chilled to congeal the wax. Used in this manner, the filter aid may be said to "dust" the various particles of solidified wax or to act as a separating film between these particles thereby placing the mixture in a more freely filtering condition.

The addition of a filter aid after chilling has various advantages over the addition prior to chilling. Tests have shown that capacities have been increased from 15% to 25%. Most filter aids are very abrasive and therefore the addition of a filter aid after chilling eliminates the necessity of passing the filter aid through the chiller and pumps. Since filter aids of the character usually used in this kind of work are excellent insulators, their addition to the oil prior to chilling decreases the rate at which the mixture can be chilled and therefore increases power consumption. Filter aid de-waxing to be commercially successful necessitates that the filter aid be used over and over again and this, of course, requires that the efficiency of the filter aid be maintained as high as possible. The individual particles of the filter aid have been found to be very fragile and it has been quite definitely demonstrated that there is an actual physical breakdown in the particles in passing through the chiller and pumps resulting in losses in the efficiency of operation of the filter aid. The addition of the filter aid after chilling materially decreases the wear and tear on it and thus tends to give it a longer life and higher efficiency. Some tests have indicated that at least on some types of oil the filter aid loses efficiency to a certain extent due to adsorption of the coloring matter of the oil. Since the adsorption of coloring matter increases with an increase in temperature it can be readily seen that the addition of a filter aid after chilling diminishes the amount of coloring matter adsorbed and thereby increases its efficiency for de-waxing purposes.

In general, it is the object of this invention to take advantage of both the benefits of adding filter aid prior to chilling as well as subsequent to chilling.

The invention possesses other features of advantage some of which with the foregoing, will be set forth at length in the following description where I shall outline in full the application of my invention to dewaxing petroleum oils. However it is to be borne in mind that my invention may be applied just as advantageously to dewaxing other mineral oils as well as animal and vegetable oils.

In carrying out my invention the oil to be dewaxed is first subjected to the usual acid and decolorizing treatments and a diluent may be added if found necessary. A small amount of filter aid such as fuller's earth or FILTER-CEL is added to act as a flocculating agent or "seed" upon which the particles of wax may be congealed when the mixture is chilled. It is to be noted that since the mixture of oil and wax is more fluid before chilling than after, the filter aid can be more readily and uniformly dispersed throughout the mixture when added prior to chilling. The "seeded" oil is then chilled in any suitable manner to congeal and solidify the wax in particles formed about or upon the grains of filter aid as a nuclei. Following this step a further quantity of filter aid is added to "dust" the particles of solidified wax and to thereby form a separating film about them which renders them freely filtering. The separation of the dusted or coated solidified wax particles and the oil can then be effected by filtering in any well known type of filter, either of the pressure type or the rotary drum or disc type.

By the addition of a small quantity of filter aid prior to chilling, I have taken advantage of the benefits to be derived from a filter aid when functioning as a flocculating and/or "seeding" agent and by the addition of a further and greater quantity of filter aid after chilling I have taken advantage of its use as a dusting or separating medium. Furthermore different kinds of filter aids can be used to advantage in the two steps. For example, the filter aid used as a "seeding" or flocculating agent prior to chilling may take the form of crystalline or paraffine wax as described in the patent to Suhr et al. #1,737,737 of Dec. 3, 1929, while FILTER-CEL may be used subsequent to chilling.

Another manner in which my invention may be carried out is to use crystalline wax both as a flocculating or "seeding" agent and as a separating agent. The wax added prior to chilling may be added either in the liquid or solid state. When used in the solid state it should be finely divided and preferably added to the oil to be dewaxed after the temperature of the oil has been lowered below the melting point of the wax. The wax added after chilling as a separating medium between individual crystals or groups of crystals should be finely subdivided.

When ready for filtration the chilled mixture may be pictured as a plurality of separated units of wax or groups of such units suspended in a bath of oil; each unit consisting of a crystalline wax particle as a nucleus surrounded by a layer of amorphous and/or crystalline wax surface coated or dusted with a film of crystalline wax. This process not only gives a free filtering mixture but by avoiding the use of filter aids such as FILTER-CEL thereby eliminates the necessity of recovering such filter aid for reuse.

I claim:

1. The process of removing wax from a wax-bearing oil which comprises first adding a non-abrasive filter aid to the oil; chilling the oil so treated to congeal the wax; adding a diatomaceous earth filter aid and then separating the oil from the resulting solid material.

2. The process of removing wax from a wax-bearing oil which comprises first adding a non-abrasive flocculating and/or seeding agent to the oil; chilling the oil so treated to congeal the wax; adding a filter aid to the chilled mass and then separating the oil from the resulting solid material.

3. The process of removing wax from a wax-bearing oil which comprises first adding a flocculating and/or seeding agent to the oil; chilling the oil so treated to congeal the wax; adding a filter aid to the chilled mass and then separating the oil from the resulting solid material.

4. The process of removing wax from a wax-bearing oil which comprises adding to the oil a hydrocarbon flocculating and/or seeding agent; chilling the oil so treated to congeal the wax; adding a diatomaceous filter aid and then separating the wax and the filter aid from the oil.

JOHN F. MITCHELL-ROBERTS.